US010587629B1

United States Patent
Kurupati et al.

(10) Patent No.: US 10,587,629 B1
(45) Date of Patent: Mar. 10, 2020

(54) REDUCING FALSE POSITIVES IN BOT DETECTION

(71) Applicant: Akamai Technologies, INc., Cambridge, MA (US)

(72) Inventors: Sreenath Kurupati, Sunnyvale, CA (US); Sridhar Machiroutu, Fremont, CA (US); Prajakta Bhurke, Fremont, CA (US); Tu Vuong, San Jose, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 15/805,100

(22) Filed: Nov. 6, 2017

Related U.S. Application Data

(60) Provisional application No. 62/418,219, filed on Nov. 6, 2016.

(51) Int. Cl.
*H04L 29/06* (2006.01)
*G06F 21/50* (2013.01)

(52) U.S. Cl.
CPC .............. *H04L 63/14* (2013.01); *G06F 21/50* (2013.01); *H04L 2463/144* (2013.01)

(58) Field of Classification Search
CPC ...................................................... H04L 63/14
USPC .............................................................. 726/23
See application file for complete search history.

(56) References Cited

U.S. PATENT DOCUMENTS

| | | | |
|---|---|---|---|
| 7,181,768 B1 * | 2/2007 | Ghosh | G06F 21/552 726/23 |
| 8,135,657 B2 * | 3/2012 | Kapoor | G06F 9/505 706/45 |
| 2014/0033317 A1 * | 1/2014 | Barber | G06Q 30/0242 726/26 |
| 2014/0096249 A1 * | 4/2014 | Dupont | G06F 21/00 726/23 |

* cited by examiner

*Primary Examiner* — Khalil Naghdali
(74) *Attorney, Agent, or Firm* — David H. Judson

(57) ABSTRACT

This disclosure describes a bot detection system that distinguishes bot transactions from human transactions. The system utilizes an anomaly-based filter process to reduce the number of false positives as determined by the system. The filter process includes maintaining a database of anomaly patterns, wherein the patterns are encoded as anomaly pattern strings. As anomalies are detected, they are encoded in the anomaly pattern strings, and the database is updated by maintaining counts on the occurrences of the strings. When a particular pattern string as reflected in the database has a count that exceeds a threshold, the string is determined to be associated with a bot as opposed to a human user.

4 Claims, 3 Drawing Sheets

REDUCING FALSE POSITIVES IN BOT DETECTION

BACKGROUND

Technical Field

This application relates generally to protecting websites and mobile applications (apps) from automated attacks by scripts or bots.

Brief Description of the Related Art

Humans conduct various online transactions on websites and native mobile apps. Transactions include signing up, logging in, resetting passwords, payments, etc. A malicious hacker may write a computer script/program to conduct web transactions. Such scripts/programs are commonly known as bots. To detect bots, anomaly detection techniques can be used. These techniques, however, often produce false positives, whereby a good human user is identified incorrectly as a bot.

BRIEF SUMMARY

This disclosure describes a bot detection system that provides a mechanism for a web/mobile server to distinguish a bot transaction versus a human transaction, and to do so in a manner to reduce false positives.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
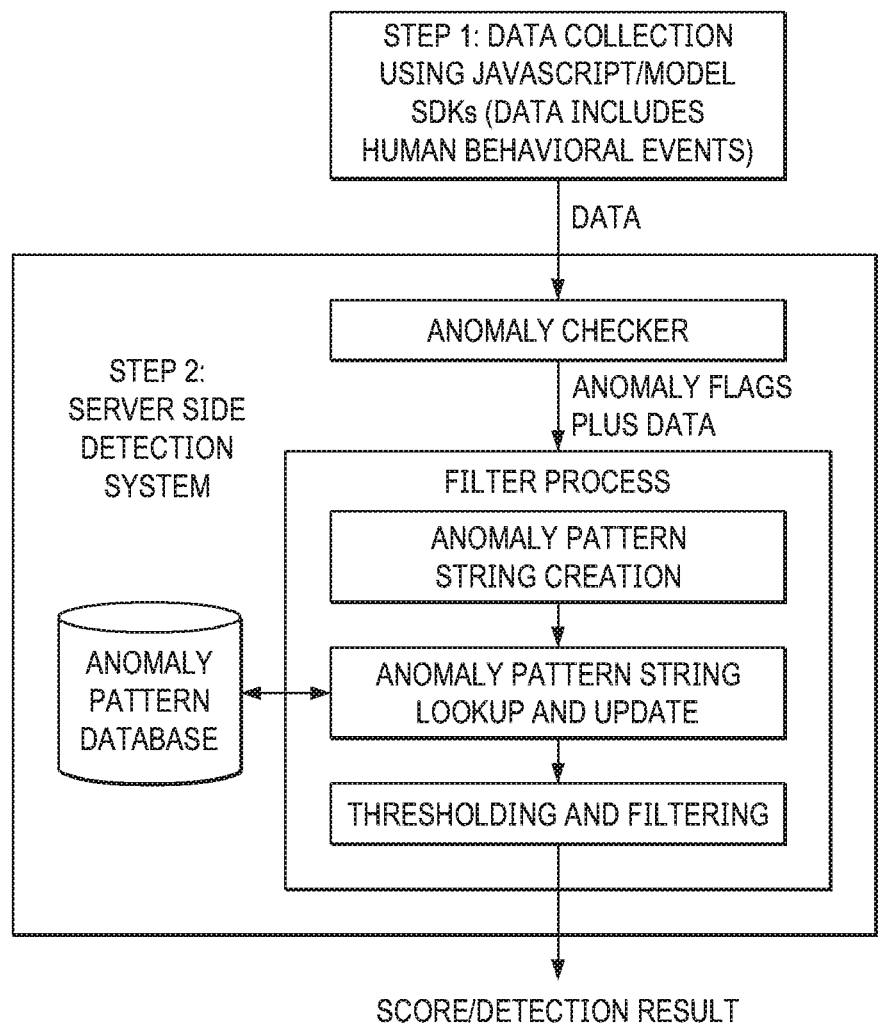
FIG. 1 depicts a process flow of a detection scheme for a bot mitigation system of this disclosure.

The depicted embodiment of the bot detection system has two components, namely client-side data collection, and server-side processing for bot detection. The two components are detailed below. As seen in FIG. 1, client-side data collection (step (1)) preferably applies to both websites and native mobile apps. On websites, the bot detection system involves collecting suitable data on the client browser using a script, such as Javascript code. The data can include behavioral interaction data, such as keystroke events, mouse events, touch events, pointer events, accelerometers events and gyroscope events. The Javascript code can also calculate a device fingerprint. The device fingerprint is a listing of various device properties, such as fonts installed, plugins installed, canvas/gfx properties, CPU and OS characteristics. The Javascript code can also collect information on the device CPU, OS and browser characteristics. On native mobile apps, similar information can be collected using an IOS/Android/Windows SDK.

The server-side processing for bot detection is step (2). On the server side, the data collected on the client side is analyzed. The server-side processing preferably involves the following processing steps. In an Anomaly Checker, the collected behavioral data is checked to see if there are anomalies from typical human behavioral data. For instance, keystroke speed can be checked against typical expected human typing speed. Mouse movement and curvature can be checked. Similarly, touch, accelerometer and device orientation events can be checked against expected human behavior. Anomaly checks can also be done against the collected CPU, OS and browser metrics. Then, Anomaly checks can be done by using statistical techniques or by more involved machine learning techniques, artificial intelligence (AI) techniques, or the like. One challenge that presents itself is that the anomaly checks may have some errors due to noise in the collected data. For instance, the collected mouse events can have errors under certain browser conditions, etc. If the anomaly checks are used directly, false positives can then occur, meaning good human data can be falsely classified as bots due to noise in the collected data or algorithmic processing errors. The subsequent steps detail a technique to reduce the false positives that can occur.

To this end, the detected anomalies plus the original data is sent to a filtering stage which is shown as a preferably multi-stage "Filter Process" in FIG. 1. An insight that is leveraged by the bot detection system is that malicious hackers employing automated scripts send numerous transactions with those scripts. On the other hand, "noisy" anomaly results from human actors will not follow specific patterns. By checking for a repeating pattern of anomalies, real malicious threats can be identified and false positives can be filtered out.

The preferred sub-stages within the "filter process" stage are detailed below.

i. In a first sub-stage, an anomaly pattern string is first created. This string contains a list of various anomaly flags that can also be concatenated with various other attributes from the data. For instance, the string can be concatenated with the device fingerprint, user-agent, etc.

ii. The next sub-stage involves checking an anomaly pattern database for the existence of the anomaly and a frequency of the anomaly. The pattern database preferably has multiple rows corresponding to different anomaly strings. Each string preferably includes the count/frequency of occurrence of the string. First, a lookup is done with the incoming string and the count/frequency is retrieved. This count/frequency is sent to the next stage. Additionally, an update is done to the database where the frequency/count is incremented for the incoming string. If the string does not exist in the database, a new row is created with an initialized count/frequency. A time window (minutes, hours, days) can be specified to constrain the count/frequency to a given time window.

iii. The pattern string count/frequency from the previous stage is then compared against a threshold. If the count exceeds a threshold, the transaction is flagged as a bot. Otherwise, the transaction is flagged as a benign human transaction. This allows for filtering out noisy human false positives while flagging malicious bots.

Figures 2, 3:
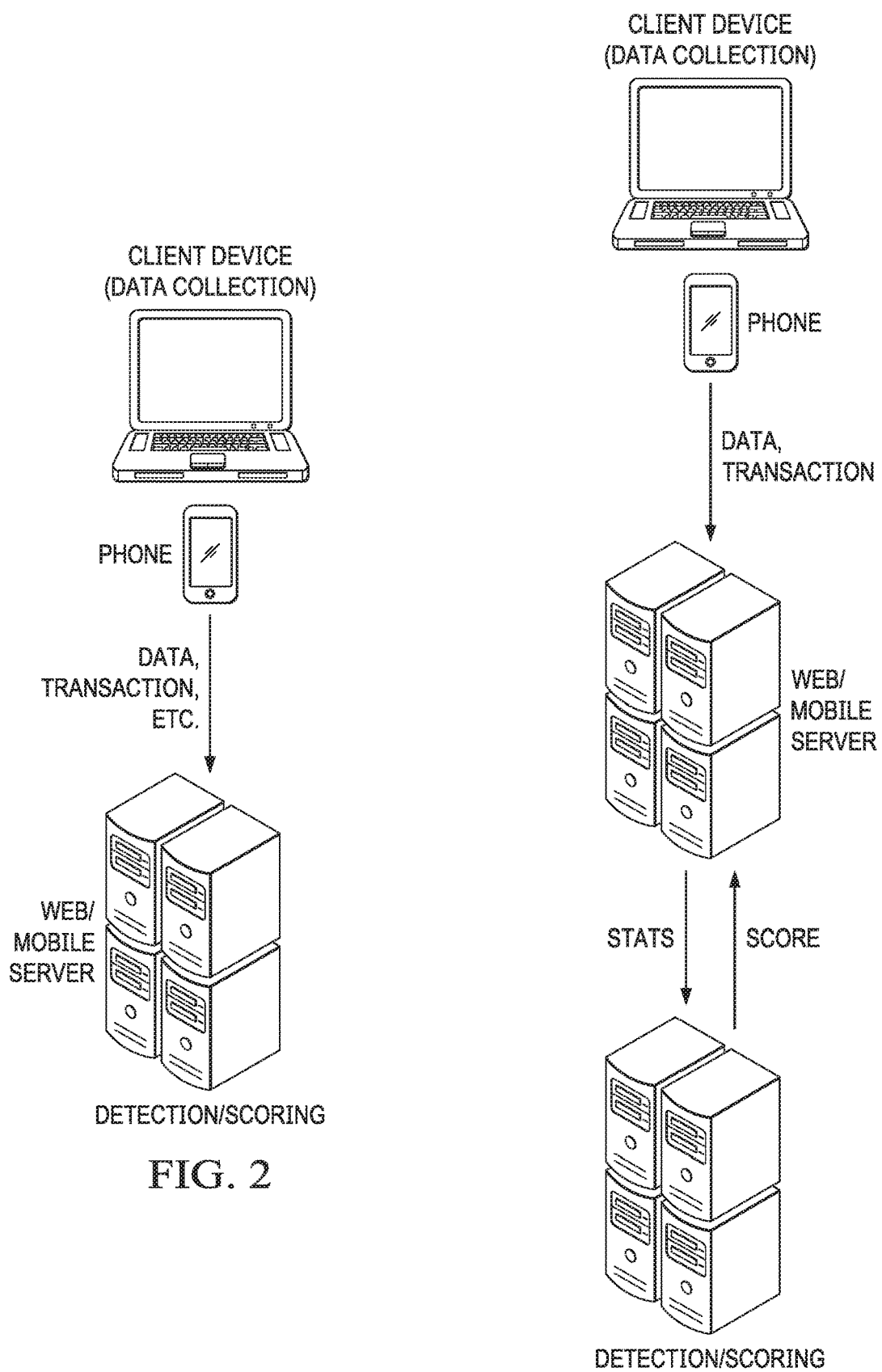
FIG. 2 depicts a first operating embodiment in which the described technique is implemented.
FIG. 3 depicts a second operating embodiment in which the technique is implemented.
Figure 4:
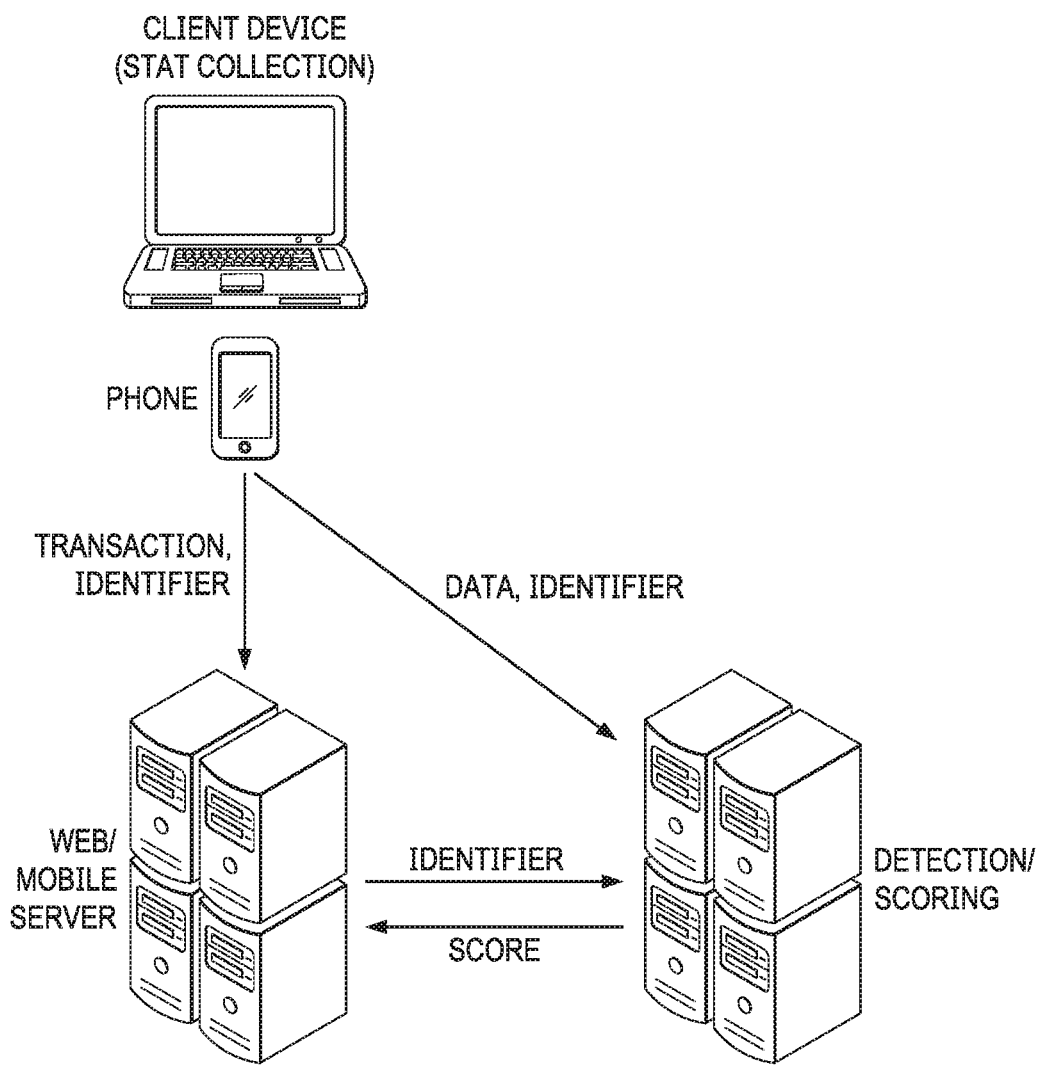
FIG. 4 depicts a third operating embodiment in which the technique is implemented.

FIGS. 2-4 depict various client-server configurations where embodiments of the bot detection system can be used.

In FIG. 2, the bot detection system of FIG. 1 is split between a client device and a web/mobile server.

In FIG. 3, the data flows across three (3) entities. In particular, data is collected on the client computer (similar to FIG. 2). The data is sent to a web/mobile server, which in turn sends the data to a threat detection server. Alternatively, the data can be sent to a scoring server. The detection server returns a score back to the web/mobile server, which in turn does the final transaction approval/rejection.

In FIG. 4, data collection is done on the client computer (similar to FIG. 3). The data is sent to a threat detection server along with a unique identifier (e.g. session id or some other unique identifier). The detection server can calculate a score. Separately, the transaction details and the unique identifier are sent to a mobile/web server. The mobile/web server can query the detection server using the unique identifier. The detection server then returns the score associated with the unique identifier. The web server can then authorize/deny the transaction based on the score.

Although depicted as a separate device, the detection server can be part of a larger system detecting various security threats (such as bots). More generally, the filter process of this disclosure may be implemented as processing logic that may comprises software, firmware, hardware, or any combination thereof.

The filter process also may rely on additional probabilistic or statistical computational methods, or combinations thereof, including using machine learning-based systems.

The techniques herein may be supplemented by other bot mitigation techniques and technologies. Thus, for example, techniques for discriminating human versus automated script behavior are described, for example, in commonly-owned U.S. Pat. No. 9,639,699, titled "Detecting non-human users on computer systems," the disclosure of which is incorporated herein by reference.

Of course, the above describes techniques are merely exemplary.

A given detection score may have a confidence level (or weight) associated therewith. The type of response generated by the transaction server itself may also be based on the confidence level value and its relationship to one or more confidence levels, which levels may be pre-configured or hard-coded.

Enabling Technologies

The techniques herein may be implemented in a computing platform. One or more functions of the computing platform may be implemented conveniently in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

One preferred implementation of the detector is in a managed service such as a content delivery network (CDN) or, more generally, an "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

In a CDN-based implementation, the web/mobile server may be implemented in an edge server, and the device masquerading detection may be a function thereof.

The nomenclature used herein is not intended to be limiting.

What is claimed is as follows:

1. A method to improve a bot mitigation computing system, comprising:
   collecting data on a client browser using a script, wherein the data comprises user behavioral interaction data; and
   analyzing the data to determine whether the data is input by a bot or a human user, wherein analyzing the data comprises:
   checking the user behavioral interaction data for anomalies, wherein an anomaly is characterized based on a deviation from an expected human behavior; and
   filtering the user behavioral interaction data and the anomalies to remove false positives, thereby improving an operation of the bot mitigation computing system, wherein the filtering comprises:
   in a first computing sub-stage, creating an anomaly pattern string comprising a plurality of anomaly flags in the anomalies concatenated with one or more attributes from the user behavioral interaction data;
   in a second computing sub-stage, checking the anomaly pattern string against an anomaly pattern database for an existence of an anomaly and a frequency count of the anomaly, wherein the anomaly pattern database has multiple rows corresponding to different anomaly pattern strings, and wherein the checking includes incrementing the frequency count upon a determination that the anomaly pattern string is already present in the anomaly pattern database; and
   in a third computing sub-stage, comparing the frequency count of the anomaly against a threshold and flagging a transaction associated with the anomaly pattern string as a bot when the threshold is exceeded.

2. The method as described in claim 1 further including updating the anomaly pattern database to include a new row upon a determination that the anomaly pattern string is not already present in the anomaly pattern database.

3. The method as described in claim 1 wherein the user behavioral interaction data is one of: keystroke events, mouse events, touch events, pointer events, accelerometer events and gyroscope events.

4. The method as described in claim 1 wherein the checking the user behavioral interaction data uses one of: a statistical technique, and a machine learning technique.

* * * * *